US009186720B2

(12) United States Patent
Murrish et al.

(10) Patent No.: US 9,186,720 B2
(45) Date of Patent: Nov. 17, 2015

(54) METHOD OF SIMULTANEOUSLY MANUFACTURING A PLURALITY OF CRANKSHAFTS

(71) Applicant: GM GLOBAL TECHNOLOGY OPERATIONS LLC, Detroit, MI (US)

(72) Inventors: Dale Edward Murrish, Troy, MI (US); Keith Hart, Oakland Township, MI (US); Maurice G. Meyer, Defiance, OH (US)

(73) Assignee: GM Global Technology Operations LLC, Detroit, MI (US)

( * ) Notice: Subject to any disclaimer, the term of this patent is extended or adjusted under 35 U.S.C. 154(b) by 100 days.

(21) Appl. No.: 14/011,070

(22) Filed: Aug. 27, 2013

(65) Prior Publication Data

US 2015/0060003 A1  Mar. 5, 2015

(51) Int. Cl.

| | |
|---|---|
| *B22C 9/10* | (2006.01) |
| *B22C 9/22* | (2006.01) |
| *B22D 25/02* | (2006.01) |
| *F16C 3/08* | (2006.01) |

(52) U.S. Cl.
CPC .............. *B22C 9/103* (2013.01); *B22C 9/108* (2013.01); *B22C 9/22* (2013.01); *B22D 25/02* (2013.01); *F16C 3/08* (2013.01)

(58) Field of Classification Search
CPC ............ B22C 9/10; B22C 9/22; B22C 9/103; B22C 9/108; B22D 25/02
USPC ........... 164/129, 137, 30, 339, 340, 369, 332, 164/112, 132, 345
See application file for complete search history.

(56) References Cited

U.S. PATENT DOCUMENTS

| | | | | |
|---|---|---|---|---|
| 4,817,257 | A | * | 4/1989 | Mascarenas ............... 29/888.08 |
| 6,189,600 | B1 | * | 2/2001 | Taniguchi et al. ............ 164/262 |
| 8,533,946 | B2 | * | 9/2013 | Murrish et al. ............ 29/888.08 |

* cited by examiner

*Primary Examiner* — Kevin P Kerns
(74) *Attorney, Agent, or Firm* — Quinn Law Group, PLLC

(57) ABSTRACT

A method of simultaneously manufacturing a plurality of crankshafts includes positioning a core system having a plurality of individual cores within a cavity of a mold having first and second halves forming an exterior shape of the crankshafts. The crankshafts' exterior shape includes a plurality of pin bearing journals and a plurality of main bearing journals. Each of the cores passes through each of the crankshafts. At least one core passes through at least one of the pin bearing journals and at least one other core passes through at least one of the main bearing journals. The method also includes introducing into the cavity molten metal to form the crankshafts. As the metal flows into the cavity and around the plurality of cores, a hollow section extending through at least one of the pin bearing journals and at least one of the main bearing journals of each crankshaft is formed.

20 Claims, 4 Drawing Sheets

METHOD OF SIMULTANEOUSLY MANUFACTURING A PLURALITY OF CRANKSHAFTS

TECHNICAL FIELD

The present disclosure generally relates to a method of simultaneously manufacturing a plurality of crankshafts for an engine.

BACKGROUND

As an example of a slider crank mechanism, an engine's crankshaft converts reciprocating linear movement of a piston into rotational movement about a longitudinal axis to provide torque to propel a vehicle, such as but not limited to a train, a boat, a plane, or an automobile. Crankshafts are a vital part of an engine, and are a starting point of engine design. Crankshaft design affects the overall packaging of the engine, and thereby the total mass of the engine. Accordingly, minimizing the size and/or mass of the crankshaft reduces the size and mass of the engine, which has a compounding effect on the overall size, mass and fuel economy of the vehicle.

The crankshaft includes at least one crankpin that is offset from the longitudinal axis, to which a reciprocating piston is attached via a connecting rod. Force applied from the piston to the crankshaft through the offset connection therebetween generates torque in the crankshaft, which rotates the crankshaft about the longitudinal axis. The crankshaft further includes at least one main bearing journal disposed concentrically about the longitudinal axis. The crankshaft is secured to an engine block at the main bearing journals. A bearing is disposed about the main bearing journal, between the crankshaft and the engine block.

In order to reduce weight of the crankshaft, a hollow section may be formed into and extend through each of the crankpins and main bearing journals. The crankshaft is frequently formed or manufactured by a casting process, such as but not limited to a green sand casting process or a shell mold casting process. Any hollow sections formed into the crankpins and/or the main bearing journals are defined by a plurality of different cores that are placed within the mold during the casting process. Each of these different cores must be precisely positioned relative to each other and the mold to properly form the hollow sections in the appropriate locations.

SUMMARY

A method of simultaneously manufacturing a plurality of crankshafts includes positioning a core system having a plurality of individual cores within a cavity of a mold. The mold includes a first half and a second half forming an exterior shape of the plurality of crankshafts. The exterior shape of each of the plurality of crankshafts produced thereby includes a plurality of pin bearing journals and a plurality of main bearing journals. Each of the plurality of individual cores is formed to pass through each of the plurality of crankshafts. At least one of the plurality of individual cores has a shape that passes through at least one of the plurality of pin bearing journals, and at least one other of the plurality of individual cores has a shape that passes through at least one of the plurality of main bearing journals.

The method also includes introducing into the cavity, via a mechanism, a molten metal to form the plurality of crankshafts. As the molten metal flows into the cavity and around the plurality of individual cores, a hollow section is formed extending through at least one of the plurality of pin bearing journals and at least one of the plurality of main bearing journals of each of the plurality of crankshafts. The method may also include forming the single core as a unitary piece to have a shape that passes through the at least one of the plurality of pin bearing journals and the at least one of the plurality of main bearing journals of each of the plurality of crankshafts.

According to the method, the plurality of individual cores together with the first and second halves of the mold may form the plurality of crankshafts in the absence of, i.e., without using, slides.

Additionally, at least one of the plurality of individual cores may have a shape that passes through the at least one of the plurality of pin bearing journals and forms an exterior portion of at least one of the plurality of main bearing journals of each of the plurality of crankshafts The plurality of individual cores may be a multiple of three. The method may also include forming each two of the multiple of three individual cores to have a shape that passes through the at least one of the plurality of pin bearing journals of each of the plurality of crankshafts. The method may additionally include forming each third of the multiple of three individual cores to have a shape that passes through the at least one of the plurality of main bearing journals of each of the plurality of crankshafts.

A proportion of the plurality of individual cores to the plurality of crankshafts may be three to two.

The forming of the plurality of individual cores may also be defined as forming the plurality of individual cores to include a plurality of lengths of material each forming a non-planar three dimensional shape.

The forming of the plurality of individual cores may be further defined as forming the plurality of individual cores to include a plurality of lengths of material each having a cross section defining a non-circular cross sectional shape. The non-circular cross sectional shape of each of the plurality of lengths may include an elliptical shape.

The forming of the plurality of individual cores may include a shape that passes through the at least one of the plurality of pin bearing journals and the at least one of the plurality of main bearing journals of each of the plurality of crankshafts may include forming the plurality of individual cores to define a plurality of non-linear paths. Additionally, each non-linear path may be arranged relative to a longitudinal axis of a respective one of the plurality of crankshafts for at least one of the hollow sections extending through at least one of the plurality of pin bearing journals or at least one of the plurality of main bearing journals of each of the plurality of crankshafts.

Each non-linear path may include a non-linear path positioned to bend the at least one hollow section away from a high stress region of one of the plurality of crankshafts.

Each non-linear path may include an angled path that is angled relative to the longitudinal axis of one of the plurality of crankshafts to linearly direct the at least one hollow section away from a high stress region of the respective crankshaft.

The forming of the plurality of individual cores may also include forming the plurality of individual cores to include one or more connecting portions having a surface that defines at least a portion of one of the main bearing journals, one of the pin bearing journals, or one of a plurality of counterweights of one of the plurality of crankshafts.

A system for simultaneously manufacturing a plurality of crankshafts is also disclosed.

The above features and advantages, and other features and advantages of the present disclosure, will be readily apparent

DETAILED DESCRIPTION

Those having ordinary skill in the art will recognize that terms such as "above", "below", "upward", "downward", "top", "bottom", etc., are used descriptively for the figures, and do not represent limitations on the scope of the invention, as defined by the appended claims.

Figure 1:
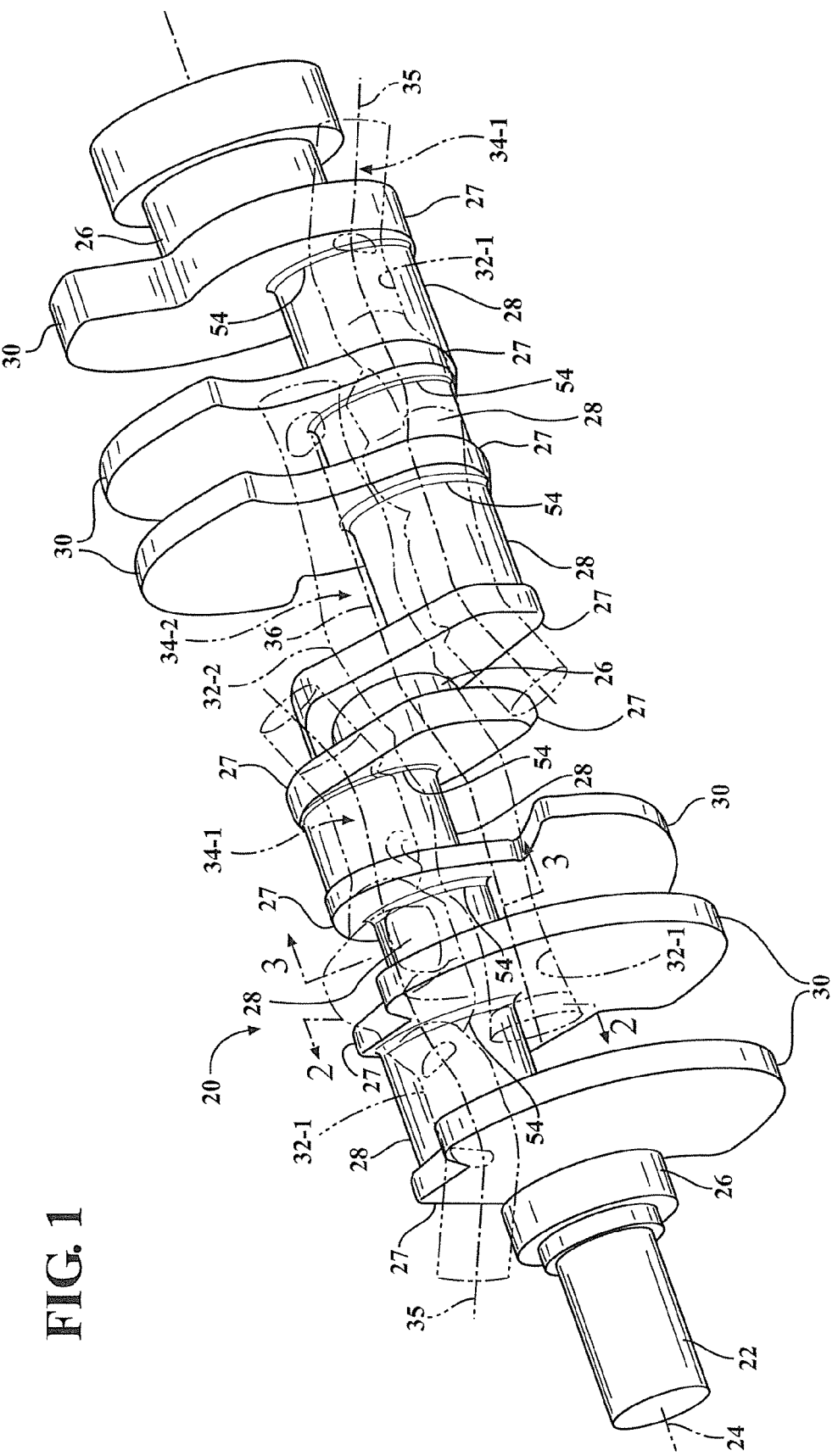
FIG. 1 is a schematic perspective view of a cast crankshaft with a portion of a core system having a plurality of individual cores shown in phantom extending therethrough.

Referring to the Figures, wherein like numerals indicate like parts throughout the several views, a crankshaft is generally shown at 20 in FIG. 1. The crankshaft 20 may be configured for an engine, such as but not limited to an internal combustion gasoline engine or a diesel engine, a compressor, or some other similar device. Typically an engine includes a single crankshaft 20. However, most engine types are manufactured in mass quantities to satisfy demand for certain engines being needed in multiple locations and for various applications. Therefore, a significant quantity of identical or largely similar crankshafts 20 must be produced to satisfy such requirements. The crankshafts 20 are frequently manufactured via a casting process. Accordingly, it may be economically advantageous to cast a number of crankshafts 20 concurrently or simultaneously, rather than casting one such crankshaft at a time. Although the disclosed method is intended to simultaneously manufacture a plurality of crankshafts 20; initially, for illustrative purposes, a single representative crankshaft 20 will be described below.

The crankshaft 20 includes a shaft 22 extending along a longitudinal axis 24 that defines a plurality of main bearing journals 26, a plurality of arms 27, a plurality of pin bearing journals 28, and a plurality of counterweights 30. The main bearing journals 26 are disposed concentrically about the longitudinal axis 24. Each of the pin bearing journals 28 is laterally offset from the longitudinal axis 24, and is attached to the main bearing journals 26 by an arm 27. Each of the arms 27 extends from one of the main bearing journals 26 to one of the pin bearing journals 28, and may or may not include one of the counterweights 30. Each of the counterweights 30 extends radially away from the longitudinal axis 24. Each of the main bearing journals 26 supports a bearing (not shown) thereabout, and provides an attachment location for attaching the crankshaft 20 to an engine block (not shown). Each of the pin bearing journals 28 support a bearing (not shown) thereabout, and provide the attachment point to which a connecting rod (not shown) attaches a piston (not shown) to the crankshaft 20.

The counterweights 30 offset the reciprocating mass of the pistons, piston rings, piston pins and retaining clips, the small ends of the connecting rods, the rotating mass of the connecting rod large ends and bearings, and the rotating mass of the crankshaft itself, i.e., the pin bearing journals 28 and the arms 27. The main bearing journals are on the crankshaft axis 24 and do not require any counterweights. The counterweights 30 reduce the unbalanced forces acting on the main bearing journals and thereby improve the durability of the bearings. The counterweights 30 balance the rotation of the crankshaft 20 about the longitudinal axis 24 to reduce vibration therein. Furthermore, since the arms 27 are structural parts of the crankshaft 20 and the counterweights 30 are merely there to reduce unbalanced forces and vibrations, the crankshaft 20 may have any number of counterweights 30 attached to the various arms 27 in any configuration. For example, an in-line four cylinder crankshaft may include six or eight counterweights, while a non-planar V-6 crankshaft may have four, five, or six counterweights. Accordingly, the specific crankshaft 20 shown in FIGS. 1-3 and described herein is merely exemplary, and should not be considered as limiting the scope of the claims.

Figure 4:
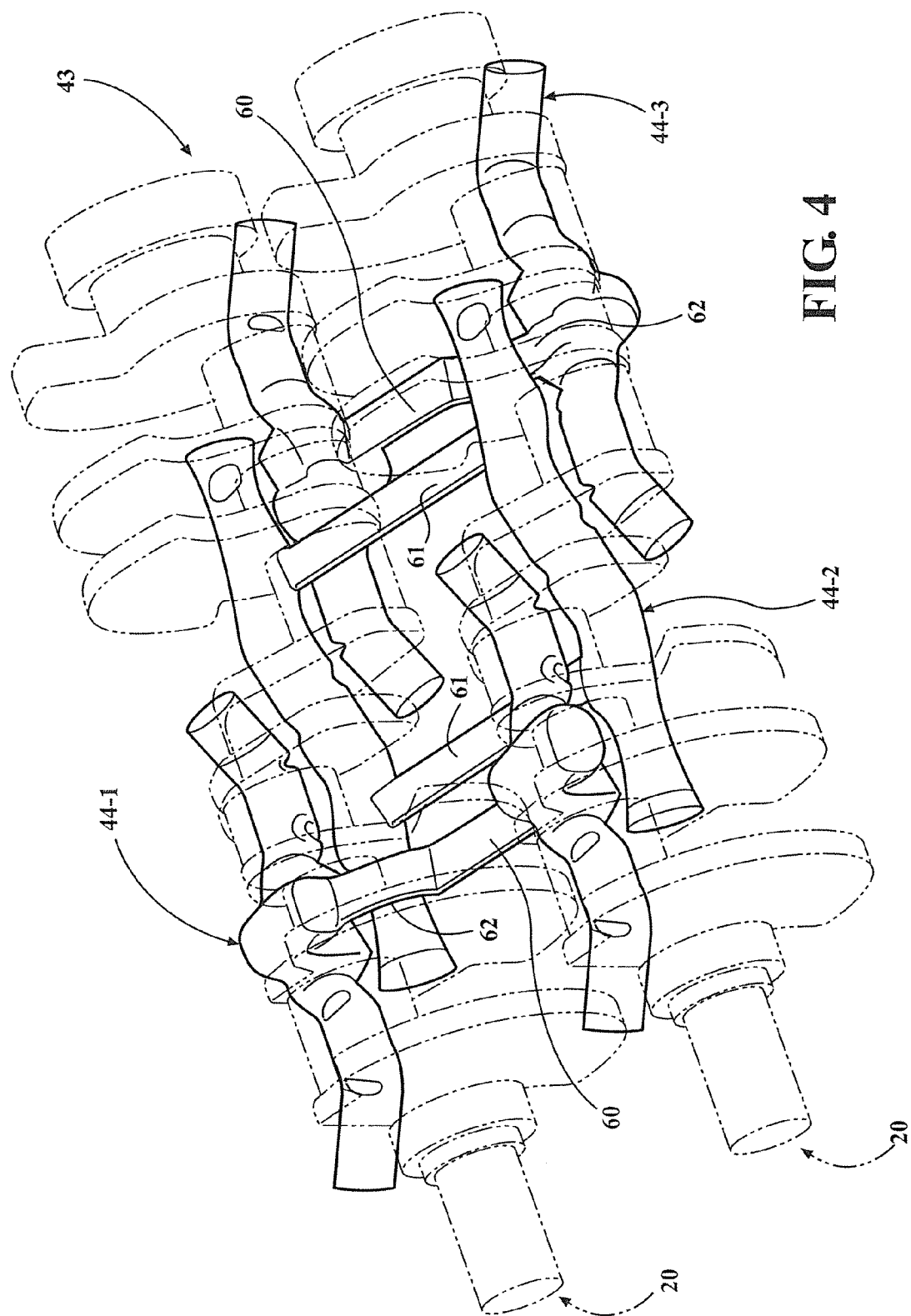
FIG. 4 is a schematic partially perspective phantom view of the plurality of cast crankshafts, such as the crankshaft shown in FIGS. 1-3, with the core system arranged for casting the crankshafts.

As shown in FIG. 1, the crankshaft 20 is representative of a non-planar type of crankshaft generally designed for use in in-line 3 cylinder, as well as certain V-6 and V-8 engines. The pin bearing journals 28 of the crankshaft 20 are not disposed along a common plane. FIG. 4 shows a core system 43 employed to simultaneously cast the plurality of non-planar crankshafts 20. The core system 43 includes a plurality of individual cores that is used to collectively define a plurality of hollow sections in at least one of the main bearing journals 26 and at least one of the pin bearing journals 28. The proportion of the plurality of individual cores in the core system 43 to the plurality of resultant crankshafts may be three to two. As shown, the core system 43 includes three individual cores 44-1, 44-2, and 44-3 that are employed together for casting two crankshafts 20. Although three individual cores and two separate crankshafts are shown, nothing precludes any other multiple of cores and crankshafts from being employed that satisfies the proportion of plurality of individual cores to the plurality of crankshafts being three to two, such as six to four, nine to six, etc. Additionally, although three individual cores 44-1, 44-2, and 44-3 are shown for casting two crankshafts 20, three individual cores spanning each of the plurality of crankshafts may be employed together for casting any number of crankshafts that is two or greater, as permitted by the strength and integrity of the particular cores.

At least one of the pin bearing journals 28 includes a hollow section 32-1 and at least one of the main bearing journals 26 includes a hollow section 32-2 extending therethrough. Each of the hollow sections 32-1, 32-2 extends generally along the longitudinal axis 24, as described in greater detail below, but not necessarily parallel to the longitudinal axis 24. The hollow sections 32-1 and 32-2 in each crankshaft 20 reduce the volume of metal used to form the crankshaft 20, thereby reducing the overall weight of the crankshaft 20. Furthermore, by reducing the weight of the pin bearing journals 28, which are laterally offset from the longitudinal axis 24, the mass of the counterweights 30 may also be reduced a corresponding amount, thereby further reducing the overall weight of each crankshaft 20.

The hollow sections 32-1 and the hollow section 32-2 each extend along individual paths relative to the longitudinal axis 24 of the shafts 22. The paths 34-1 and 34-2 of the respective hollow sections 32-1 and 32-2 are configured to minimize stresses within the respective shaft 22, between the various components thereof, i.e., between the adjoining main bearing journals 26, the pin bearing journals 28 and the arms 27. The paths 34-1 and 34-2 of the hollow sections 32-1 and 32-2 may include non-linear paths that follow centerlines 35 and 36, respectively, designed to bend the hollow sections 32-1, 32-2 away from a high stress region of the crankshaft 20, such as shown at 54, or may include a linear path angled relative to the longitudinal axis 24 to angle the particular hollow section away from the high stress regions 54 of the crankshaft 20. The specific centerline 35, 36 of each of the hollow sections 32-1, 32-2 in the pin bearing journals 28 and the main bearing journals 26, respectively, and the cross sectional shape of each of the hollow sections is dependent upon the specific shape, size, and configuration of the crankshaft 20.

Figure 2:
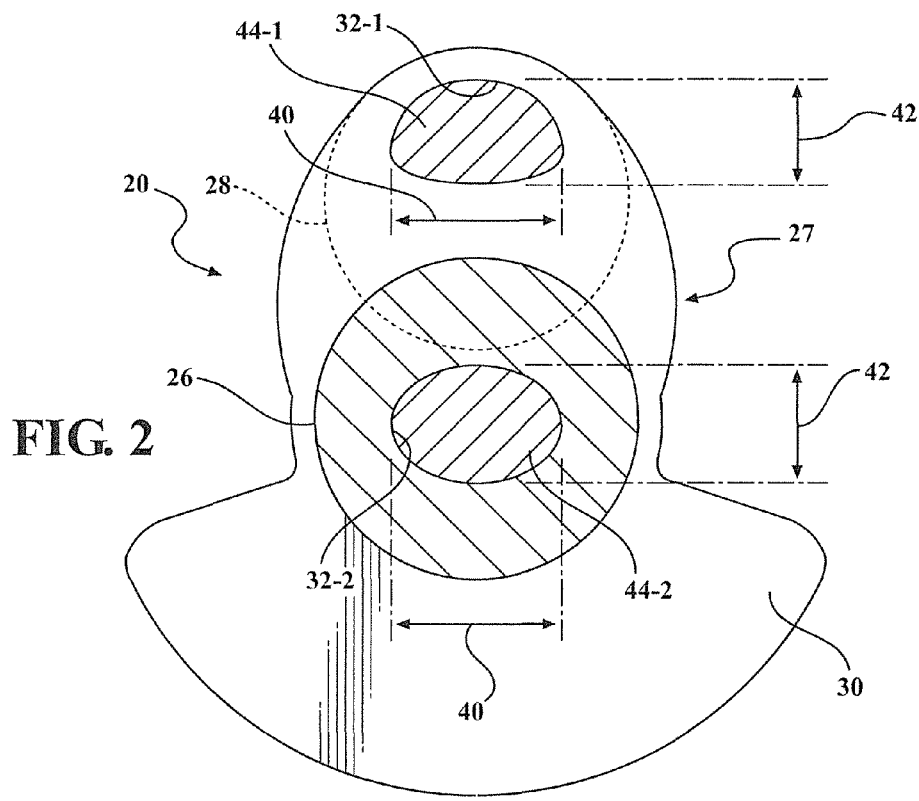
FIG. 2 is a schematic cross sectional view taken along cut line 2-2 shown in FIG. 1 showing a cross sectional shape of one of the plurality of individual cores and the resulting hollow section in the cast crankshaft shown in FIG. 1.

Referring to FIG. 2, each of the hollow sections 32-1, 32-2 includes a cross section defining a shape. The cross sectional shape of each of the hollow sections 32-1, 32-2 may include but is not limited to a non-circular shape. As shown in FIG. 2, the cross sectional shape of the hollow sections 32-1, 32-2 includes a cross sectional elliptical shape. The elliptical cross sectional shape of each of the hollow sections 32-1, 32-2 includes a major axis 40 and a minor axis 42. The major axis 40 preferably includes but is not limited to a distance between the range of 25 mm and 40 mm. The minor axis 42 preferably includes but is not limited to a distance between the range of 15 mm and 35 mm. The elliptical shape of the hollow sections 32-1, 32-2 maximizes the reduction in material used to form the crankshaft 20, thereby maximizing the reduction in weight thereof.

Figure 3:
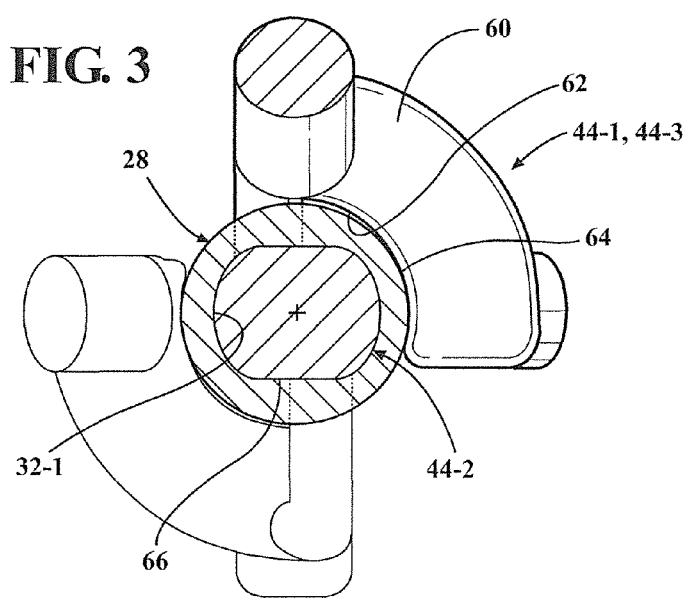
FIG. 3 is a schematic cross sectional view taken along cut line 3-3 shown in FIG. 1.

As shown in FIGS. 2-4, each of the three individual cores 44-1, 44-2, and 44-3 of the core system 43 includes at least one connecting portion 60. In addition to various elements of cores 44-1 and 44-2 being used to form features of two or more individual crankshafts 20, one or more connecting portion 60 includes a surface that forms at least a portion, such as the exterior, of one of the main bearing journals 26, one of the pin bearing journals 28, or one of the counterweights 30 of each of the two or more individual crankshafts. Furthermore, each connecting portion 60 may include the subject surface that forms at least a portion of one of the main bearing journals 26, one of the pin bearing journals 28, or one of the counterweights 30 of each of the two or more individual crankshafts. The connecting portions 60 allow a size of the individual cores 44-1, 44-2, and 44-3 to be increased in the specific region, thereby improving the strength of the particular individual core. As best shown in FIG. 4, the connecting portion 60 each of the individual cores 44-1 and 44-3 includes a radially inner surface 62 that forms an exterior surface 64 of at least one of the main bearing journals 26. Additionally, as shown, each of the individual cores 44-1 and 44-3 includes an outer surface 66 that forms the hollow sections 32-1 in the pin bearing journals 28 of each crankshaft 20. The individual core 44-2 of the core system 43 includes at least one connecting portion 61. The connecting portion 61 connects elements of core 44-2 used to form the hollow section 32-2 of the main bearing journal 26 in each of the two or more individual crankshafts 20.

Although a particular number of connecting portions 60 and 61 is shown, it should be appreciated that each of the individual cores 44-1, 44-2, and 44-3 may be formed to include one or more other connecting portions that form at least a portion of one of the pin bearing journals 28, one of the main bearing journals 26, or one of the counterweights 30 of each of the plurality of crankshafts 20. Additionally, it should be appreciated that the crankshafts 20 may be configured differently than shown in FIGS. 1-3. As such, the crankshafts 20 may be configured as a plurality of crankshafts for any style and/or configuration of engine, including but not limited to an in-line style engine having three, four, or six cylinders, or some other number of cylinders, and cast using the core system 43.

Figure 5:
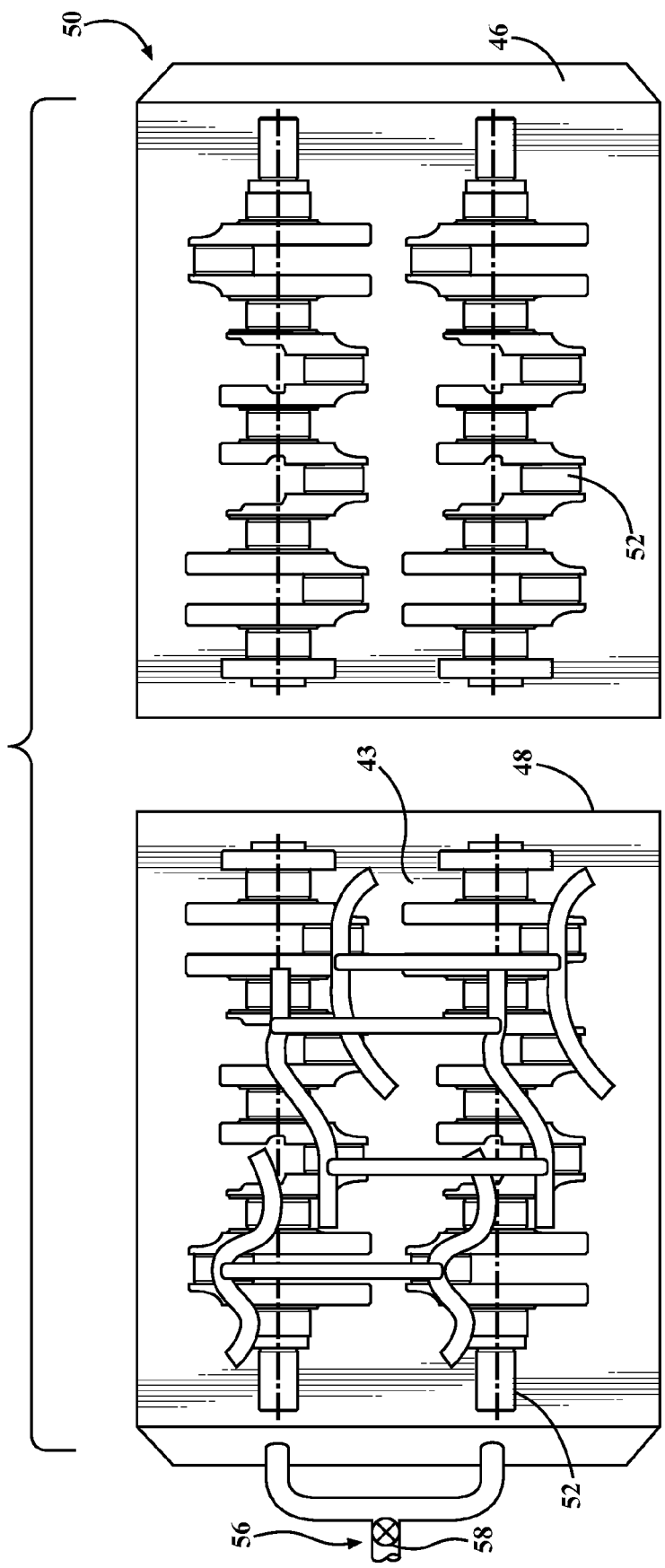
FIG. 5 is a schematic plan view of a mold for simultaneously casting the plurality of crankshafts with the core system having the plurality of individual cores shown in FIG. 1 disposed therein.

FIG. 4 depicts a plurality of crankshafts 20 in phantom, with the core system 43 having individual cores 44-1, 44-2, and 44-3 arranged relative thereto for forming specific features of each crankshaft. FIG. 5 depicts a plurality of crankshafts 20 arranged side by side for simultaneous forming during a casting process. Although two identical crankshafts 20 are shown, nothing precludes the number of crankshafts from being greater than two or the crankshafts having some dissimilar features, such as the pin bearing journals 28 or the main bearing journals 26. As shown, each of the hollow sections 32-1, 32-2 in each of the plurality of main bearing journals 26 and each of the pin bearing journals 28 is simultaneously formed by the core system 43 using the plurality of individual cores 44-1, 44-2, and 44-3 when the plurality of crankshafts 20 is cast. Because, as shown, the intended proportion of the plurality of individual cores to the plurality of crankshafts is set at three to two, each of the plurality of individual cores 44-1, 44-2, and 44-3 is formed to pass through each of the two crankshafts 20. Accordingly, for each two crankshafts sought to be formed, three individual cores are installed between a first half 46 and a second half 48 of a specially designed mold 50. As shown, the plurality of individual cores 44-1, 44-2, and 44-3 is formed with a shape configured to extend through each of the main bearing journals 26 and the pin bearing journals 28 at the precise location of the hollow sections 32-1, 32-2 thereof, without interfering or otherwise contacting the other sections of each of the two shafts 22, such as but not limited to the counterweights 30.

Preferably, the plurality of crankshafts 20 is simultaneously formed through a casting process, such as but not limited to a green sand casting process or a shell mold casting process, as generally understood by those skilled in the art. As such, referring to FIG. 5, manufacturing or casting the plurality of crankshafts 20 includes forming the first half 46 and the second half 48 of the mold 50 to define a cavity 52 therebetween simultaneously forming an exterior shape of the plurality of subject crankshafts. The first half 46 may be referred to as a cope or upper half, and the second half 48 may be referred to as a drag or lower half. As is generally understood, the first half 46 and the second half 48 of the mold 50 may be formed by pressing a template defining half of the desired finished exterior shape of the plurality of crankshafts 20 into a form of green sand or some other suitable medium, thereby leaving a negative imprint of that half of the plurality of crankshafts therein. Upon combining the first half 46 and the second half 48 together to form the mold 50, the negative imprints therein adjoin to complete the cavity 52 and simultaneously define the exterior shape of the plurality of crankshafts 20. The exterior shape of the plurality of crankshafts 20 includes the pin bearing journals 28, the arms 27, the main bearing journals 26, and the counterweights 30 of each crankshaft. As shown in FIG. 1, each of the crankshafts 20 includes four pin bearing journals 28, eight arms 27, five main bearing journals 26, and six counterweights 30. Accordingly, the first half 46 and the second half 48 of the mold 50 are formed to define a cavity 52 that forms the four pin bearing journals 28, the five main bearing journals 26, six webs with counterweights 30, and two webs without any counterweights 30 for each of the crankshafts. However, as described above, the specific number of pin bearing journals 28 and main bearing journals 26 for each of the plurality of crankshafts 20 may differ from the exemplary embodiment shown and described herein.

Each of the hollow sections 32-1 and 32-2 in each of the plurality of main bearing journals 26 and each of the pin bearing journals 28, respectively, is simultaneously formed by the core system 43 without the use of slides when the plurality of crankshafts 20 is cast. Generally, slides are moving elements that are inserted into the mold to form parts and then removed so the part can be extracted from the mold. Slides typically move into a cavity positioned inside the mold perpendicular to the draw direction, to form overhanging part features. Usually, the use of slides during the casting process allows more accurate reproduction of details than traditional two-piece molds. In the present case, no slides are employed because the individual cores 44-1, 44-2, 44-3 are collectively configured, i.e., designed and positioned, to define all the required features of the hollow sections 32-1 and 32-2 in the main bearing journals 26 and in the pin bearing journals 28 of each of the plurality of crankshafts 20.

As shown in FIG. 4, each of the individual cores 44-1 and 44-3 is formed to pass through at least one of the plurality of pin bearing journals 28 in the plurality of crankshafts 20. The individual core 44-2 is formed to pass through at least one of the plurality of main bearing journals 26 in each of the plurality of crankshafts 20. As shown in FIG. 1, the plurality of individual cores 44-1, 44-2, and 44-3 is configured to define a hollow section in all four of the pin bearing journals 28 and three of the main bearing journals 26 of each crankshaft 20. The core system 43 may be formed, for example, through a sand molding process as generally understood for forming cores that form voids in castings.

As shown in FIG. 1, each of the plurality of individual cores 44-1, 44-2, and 44-3 may be formed to include a length of material having a circular or non-circular cross section and forming a planar shape. However, in order to use the core system 43 to simultaneously cast a plurality of crankshafts for other engine configurations, each of the plurality of individual cores 44-1, 44-2, and 44-3 may be formed to include a length of material having a circular or non-circular cross section. Such a length of material may form a non-planar three dimensional shape in each of the plurality of crankshafts 20, such as shown in FIG. 1. Additionally, the core system 43 may be formed such that together the individual cores define or form all the hollow sections 32-1 and 32-2 in the main bearing journals 26 and the pin bearing journals 28 in each of the plurality of crankshafts 20, without otherwise touching or interfering with the other sections of each of the crankshafts 20, such as but not limited to the counterweights 30. Accordingly, each of the plurality of individual cores 44-1, 44-2, and 44-3 may be formed in a manner to partially define a portion of each of the plurality of crankshafts 20, such as but not limited to the main bearing journals 26, the pin bearing journals 28, or the counterweights 30.

As shown in FIG. 2, the cross sectional shape of each of the plurality of individual cores 44-1, 44-2, and 44-3 may be formed to define but is not limited to an elliptical shape. The cross sectional shape of each of the plurality of individual cores 44-1, 44-2, and 44-3 may extend along a linear path or a non-linear path, and may alternatively spiral about a central axis of the cross sectional shape. The cross sectional shape of each of the individual cores 44-1, 44-3 defines and/or forms the cross sectional shape of the hollow sections 32-1, while the individual core 44-2 defines and/or forms the cross sectional shape of the hollow sections 32-2. As described above, the elliptical shape includes the major axis 40 having, in one embodiment, a distance between the range of 25 mm and 40 mm, and the minor axis 42 having a distance between the range of 15 mm and 35 mm. The specific cross sectional shape of each of the plurality of individual cores 44-1, 44-2, and 44-3 is dependent upon the specific size, shape and configuration of each crankshaft 20, and is configured to minimize the amount of material used to form the plurality of crankshafts 20, while still providing each crankshaft with all required strength and/or stiffness. Accordingly, the cross sectional shape of the plurality of individual cores, as well as the resulting hollow sections defined thereby, may differ from the cross sectional shape of the specific individual cores and hollow cross sections shown and described herein.

The core system 43 combines the plurality of individual cores, shown as 44-1, 44-2, and 44-3, to define each of the hollow sections 32-1, 32-2. Accordingly, the plurality of individual cores 44-1, 44-2, and 44-3 may be formed to define non-linear paths 34-1 and 34-2 along the respective centerlines 35 and 36 relative to the longitudinal axis 24. The paths 34-1, 34-2 of each of the hollow sections 32-1, 32-2 are configured to bend or angle the respective hollow sections away from high stress regions of each of the plurality of crankshafts 20, thereby retaining as much material around the high stress regions of the crankshafts as possible to improve the strength thereof, while minimizing the weight of the subject crankshafts. For example, as shown in FIG. 1, a region 54 of each of the plurality of crankshafts 20 between an adjacent main bearing journal 26 and pin bearing journal 28 may be defined as a high stress region 54. As such, the paths 34-1, 34-2 that the hollow sections 32-1, 32-2 follow through either of the adjacent main bearing journal 26 and pin bearing journal 28 of each of the plurality of crankshafts 20 directs the respective hollow section away from the intersection between the adjacent main bearing journal 26 and pin bearing journal 28, thereby maximizing the material in this region 54 to increase the strength of each shaft 22.

Exemplary positioning of the core system 43 within the cavity of the mold 50 is shown in FIG. 5. Once the plurality of individual cores 44-1, 44-2, and 44-3 is properly formed to collectively define all of the hollow sections 32-1, 32-2 through the main bearing journals 26 and the pin bearing journals 28 of the plurality of crankshafts 20, the resultant core system 43 is positioned within the cavity 52 between the first half 46 and the second half 48 of the mold 50. Once properly positioned relative to the first half 46 and the second half 48 of the mold 50, the core system 43 is automatically properly positioned to form all of the hollow sections 32-1, 32-2 through each of the main bearing journals 26 and the pin bearing journals 28 of the plurality of crankshafts 20.

Once the core system 43 is positioned within the cavity 52 and the first half 46 of the mold 50 is secured relative to the second half 48 of the mold 50, a molten metal is introduced into the cavity 52 via a mechanism 56 (shown in FIG. 5) to form the plurality of crankshafts 20. The mechanism 56 may be a system of runners, regulated via a flow valve 58, and operatively connected to the mold 50 for supplying molten metal. When introduced via the mechanism 56, the molten metal flows into the cavity 52 and around the plurality of individual cores 44-1, 44-2, and 44-3 to simultaneously form each of the hollow sections 32-1, 32-2 extending through each of the pin bearing journals 28 and each of the main bearing journals 26 of each of the plurality of crankshafts 20. After the molten metal is introduced, e.g., poured, into the cavity 52, the molten metal is allowed to cool and solidify. Once solidified, the first half 46 and the second half 48 of the mold 50 may be separated, thereby exposing the plurality of cast crankshafts 20 and the plurality of individual cores 44-1, 44-2, and 44-3. The core system 43 may then be removed from the crankshafts 20 by breaking, chipping and/or flushing away the material forming the plurality of individual cores 44-1, 44-2, and 44-3, thereby leaving the plurality of crankshafts 20 with the hollow sections 32-1, 32-2 formed in each one.

Figure 6:
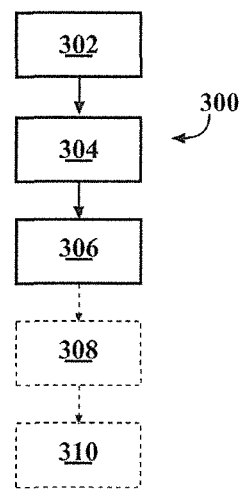
FIG. 6 is a flow diagram of a method of simultaneously manufacturing the plurality of crankshafts shown in FIGS. 4-5.

FIG. 6 depicts a method 300 of simultaneously manufacturing a plurality of crankshafts 20 shown in FIGS. 1-5. Accordingly, the method commences in frame 302 with providing the core system 43 of individual cores 44-1, 44-2, and 44-3 for the casting process. In frame 302, the method includes forming at least one of the individual cores 44-1, 44-2, and 44-3 to have a shape that passes through the plurality of main bearing journals 26 and the plurality of pin bearing journals 28 of each of the plurality of crankshafts 20. Following frame 302 the method advances to frame 304, where the method includes positioning the plurality of individual cores 44-1, 44-2, and 44-3 within the cavity 52 of the mold 50. Following frame 304 the method proceeds to frame 306, where the method includes introducing into the cavity 52 via the mechanism 56 a molten metal to form the plurality of crankshafts 20. In the frame 306, the molten metal flows into the cavity 50 and around the plurality of individual cores 44-1, 44-2, and 44-3 to simultaneously form the hollow sections 32-1, 32-2 extending through the plurality of main bearing journals 26 and the plurality of pin bearing journals 28 of each of the plurality of crankshafts 20.

Additionally, following frame 306 the method may advance to frame 308, where, once solidified, the first half 46 and the second half 48 of the mold 50 may be separated, thereby exposing the plurality of cast crankshafts 20 and the core system 43 having the plurality of individual cores 44-1, 44-2, and 44-3. Following frame 308, the core system 43 is then removed from the crankshafts by breaking, chipping and/or flushing away the material forming the plurality of individual cores 44-1, 44-2, and 44-3 in frame 310, thereby leaving the plurality of crankshafts 20 with the hollow sections 32-1 and 32-2 formed in each one.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A method of simultaneously manufacturing a plurality of crankshafts, the method comprising:
    positioning a core system having a plurality of individual cores within a cavity of a mold having a first half and a second half forming an exterior shape of the plurality of crankshafts, wherein:
        the exterior shape of each of the plurality of crankshafts includes a plurality of pin bearing journals and a plurality of main bearing journals, wherein each of the plurality of individual cores is formed to pass through each of the plurality of crankshafts; and
        at least one of the plurality of individual cores has a shape that passes through at least one of the plurality of pin bearing journals and at least one other of the plurality of individual cores has a shape that passes through at least one of the plurality of main bearing journals;
    introducing into the cavity via a mechanism a molten metal to form the plurality of crankshafts, including flowing the molten metal into the cavity and around the plurality of individual cores to simultaneously form a hollow section extending through at least one of the plurality of pin bearing journals and at least one of the plurality of main bearing journals of each of the plurality of crankshafts; and
    removing the core system from the plurality of crankshafts to thereby expose the hollow section in each of the plurality of crankshafts.

2. The method as set forth in claim 1, wherein the plurality of individual cores together with the first and second halves of the mold form the plurality of crankshafts without using slides.

3. The method as set forth in claim 1, wherein at least one of the plurality of individual cores has a shape that passes through the at least one of the plurality of pin bearing journals and forms an exterior portion of at least one of the plurality of main bearing journals of each of the plurality of crankshafts.

4. The method as set forth in claim 3, wherein a proportion of the plurality of individual cores to the plurality of crankshafts is three to two.

5. The method as set forth in claim 1, wherein forming the plurality of individual cores is further defined as forming the plurality of individual cores to include a plurality of lengths of material each forming a non-planar three dimensional shape.

6. The method as set forth in claim 1, wherein forming the plurality of individual cores is further defined as forming the plurality of individual cores to include a plurality of lengths of material, each having a cross section defining a non-circular cross sectional shape.

7. The method as set forth in claim 1, wherein forming the plurality of individual cores includes a forming shape that passes through the at least one of the plurality of pin bearing journals, the at least one of the plurality of main bearing journals of each of the plurality of crankshafts includes forming the plurality of individual cores to define a plurality of non-linear paths, and wherein each non-linear path is arranged relative to a longitudinal axis of a respective one of the plurality of crankshafts for at least one of the hollow sections extending through at least one of the plurality of pin bearing journals or at least one of the plurality of main bearing journals of each of the plurality of crankshafts.

8. The method as set forth in claim 7, wherein each non-linear path includes a non-linear path positioned to bend the at least one hollow section away from a high stress region of one of the plurality of crankshafts.

9. The method as set forth in claim 7, wherein each non-linear path includes an angled path that is angled relative to the longitudinal axis of one of the plurality of crankshafts to linearly direct the at least one hollow section away from a high stress region of the respective crankshaft.

10. The method as set forth in claim 1, wherein forming the plurality of individual cores includes forming the plurality of individual cores to include one or more connecting portions having a surface that defines at least a portion of one of the main bearing journals, one of the pin bearing journals, or one of a plurality of counterweights of one of the plurality of crankshafts.

11. A system for simultaneously manufacturing a plurality of crankshafts, the system comprising:
a mold having a first half and a second half forming an exterior shape of the plurality of crankshafts and defining an inner cavity, wherein the exterior shape of each of the plurality of crankshafts includes a plurality of pin bearing journals and a plurality of main bearing journals;
a removable core system having a plurality of individual cores within the inner cavity of the mold defining a hollow section extending through at least one of the plurality of pin bearing journals and at least one of the plurality of main bearing journals of each of the plurality of crankshafts, wherein each of the plurality of individual cores is formed to pass through each of the plurality of crankshafts and at least one of the plurality of individual cores has a shape that passes through at least one of the plurality of pin bearing journals and at least one other of the plurality of individual cores has a shape that passes through at least one of the plurality of main bearing journals and, wherein the removable core system is removed from the plurality of crankshafts to thereby expose the hollow section in each of the plurality of crankshafts; and
a mechanism for introducing a molten metal into the cavity to form the plurality of crankshafts such that the molten metal flows into the cavity and around the plurality of individual cores to simultaneously form a hollow section extending through at least one of the plurality of pin bearing journals and at least one of the plurality of main bearing journals of each of the plurality of crankshafts.

12. The system as set forth in claim 11, wherein the plurality of individual cores together with the first and second halves of the mold form the plurality of crankshafts without using slides.

13. The system as set forth in claim 11, wherein at least one of the plurality of individual cores has a shape that passes through the at least one of the plurality of pin bearing journals and forms an exterior portion of at least one of the plurality of main bearing journals of each of the plurality of crankshafts.

14. The system as set forth in claim 13, wherein a proportion of the plurality of individual cores to the plurality of crankshafts is three to two.

15. The system as set forth in claim 11, wherein the plurality of individual cores further includes a plurality of lengths of material, each forming a non-planar three dimensional shape.

16. The system as set forth in claim 11, wherein the plurality of individual cores further includes a plurality of lengths of material, each having a cross section defining a non-circular cross sectional shape.

17. The system as set forth in claim 11, wherein the plurality of individual cores define a plurality of non-linear paths, and wherein each non-linear path is arranged relative to a longitudinal axis of a respective one of the plurality of crankshafts for at least one of the hollow sections extending through at least one of the plurality of pin bearing journals or at least one of the plurality of main bearing journals of each of the plurality of crankshafts.

18. The system as set forth in claim 17, wherein each non-linear path includes a non-linear path positioned to bend the at least one hollow section away from a high stress region of one of the plurality of crankshafts.

19. The system as set forth in claim 17, wherein each non-linear path includes an angled path that is angled relative to the longitudinal axis of one of the plurality of crankshafts to linearly direct the at least one hollow section away from a high stress region of the respective crankshaft.

20. The system as set forth in claim 11, wherein one or more of the plurality of individual cores includes one or more connecting portions having a surface that defines at least a portion of one of the main bearing journals, one of the pin bearing journals, or one of a plurality of counterweights of one of the plurality of crankshafts.

* * * * *